United States Patent
Behl et al.

(10) Patent No.: US 7,801,970 B2
(45) Date of Patent: Sep. 21, 2010

(54) METHOD AND SYSTEM FOR EFFICIENTLY HANDLING NAVIGATIONAL STATE IN A PORTAL

(75) Inventors: Stefan Behl, Backnang (DE); Carsten Leue, Sindelfingen (DE); Falk Posch, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 1087 days.

(21) Appl. No.: 11/299,450

(22) Filed: Dec. 9, 2005

(65) Prior Publication Data

US 2007/0136415 A1    Jun. 14, 2007

Related U.S. Application Data

(60) Provisional application No. 60/748,699, filed on Dec. 8, 2005.

(51) Int. Cl.
*G06F 15/16* (2006.01)

(52) U.S. Cl. ................. 709/217; 709/203; 709/219; 715/234; 715/240; 715/243; 715/760

(58) Field of Classification Search ............. 709/203, 709/217, 219; 715/201, 202, 204, 208, 221–226; 717/144
See application file for complete search history.

(56) References Cited

U.S. PATENT DOCUMENTS

| | | | | |
|---|---|---|---|---|
| 5,812,769 A | * | 9/1998 | Graber et al. | 709/228 |
| 6,035,330 A | * | 3/2000 | Astiz et al. | 709/218 |
| 6,081,842 A | * | 6/2000 | Shachar | 709/229 |
| 6,338,089 B1 | * | 1/2002 | Quinlan | 709/227 |
| 6,606,525 B1 | * | 8/2003 | Muthuswamy et al. | 700/52 |
| 6,907,572 B2 | * | 6/2005 | Little et al. | 715/762 |

(Continued)

OTHER PUBLICATIONS

IBM, WebSphere Portal for z/OS, <http://publib.boulder.ibm.com/infocenter/wpdoc/v510/index.jsp>, 2000, Sections "Designing your portal" and "Administering your portal".*

(Continued)

*Primary Examiner*—Saleh Najjar
*Assistant Examiner*—Sarah E Drabik
(74) *Attorney, Agent, or Firm*—David A. Dagg

(57) ABSTRACT

The present invention provides a method and system for efficiently handling navigational state by separating the latest navigational state into a base navigational state part and a delta navigational state part. The base navigational state which describes that part of the latest navigational state that is identical across all URLs is encoded in the header of the page markup to be submitted to the client's browser. The delta navigational part that describes the semantics of that specific URL is encoded in its associated URL. Each user interaction using such URL causes the browser to submit the base part as well as the delta part. On the server side the base and delta part are being merged resulting in new navigation state serving as a base for the rendering of the new page. The navigational state is represented as a hierarchical tree-like structure that can be serialized efficiently and compressed by prior art compression techniques. The hierarchical tree-like structure is based on a well-defined state model that is optimized in terms of state serialization. The state model arranges the contained navigational state information in character based information. That saves processing time as it avoids type conversion of navigational information. In addition the present invention includes further strategies to reduce the amount of information that must be serialized.

12 Claims, 5 Drawing Sheets

U.S. PATENT DOCUMENTS

| | | |
|---|---|---|
| 7,290,008 B2 * 10/2007 | Balva et al. | 707/103 X |
| 7,302,402 B2 * 11/2007 | Callaghan et al. | 705/26 |
| 7,334,257 B1 * 2/2008 | Ebrahimi et al. | 726/3 |
| 2002/0010715 A1 * 1/2002 | Chinn et al. | 707/514 |
| 2003/0037232 A1 * 2/2003 | Bailiff | 713/153 |
| 2004/0031058 A1 * 2/2004 | Reisman | 725/112 |
| 2004/0133887 A1 * 7/2004 | Herle et al. | 717/171 |
| 2004/0193699 A1 * 9/2004 | Heymann et al. | 709/218 |
| 2004/0205473 A1 * 10/2004 | Fisher et al. | 715/500 |
| 2004/0243928 A1 * 12/2004 | Hesmer et al. | 715/505 |
| 2005/0065797 A1 * 3/2005 | Haenel | 704/270.1 |
| 2005/0177595 A1 * 8/2005 | Krieg et al. | 707/104.1 |
| 2005/0262219 A1 * 11/2005 | Allamaraju et al. | 709/217 |
| 2006/0085520 A1 * 4/2006 | Allamaraju et al. | 709/218 |
| 2006/0129935 A1 * 6/2006 | Deinlein et al. | 715/733 |
| 2007/0067727 A1 * 3/2007 | Jolley et al. | 715/742 |

OTHER PUBLICATIONS

Gornitsky et al., "What's new in WebSphere Portal V5.1.0.1: IBM's domination of the portal market continues.(Websphere Portal)", <http://www.accessmylibrary.com/coms2/summary_0286-9550677_ITM>, Jun. 1, 2005, WebSphere Journal.*

IBM, "IBM WebSphere Portal for Multiplatforms Version 5.0.2", May 12, 2005, Section "URL Mapping", retrieved from <http://publib.boulder.ibm.com/pvc/wp/502/ent/en/InfoCenter/wpf-admin-ent.pdf>.*

Richmond, Alan, "HTML's BASE tag", Nov. 30, 2004, retrieved from <http://web.archive.org/web/20041130031521/http://www.wdvl.com/Authoring/HTML/Head/base.html>.*

* cited by examiner

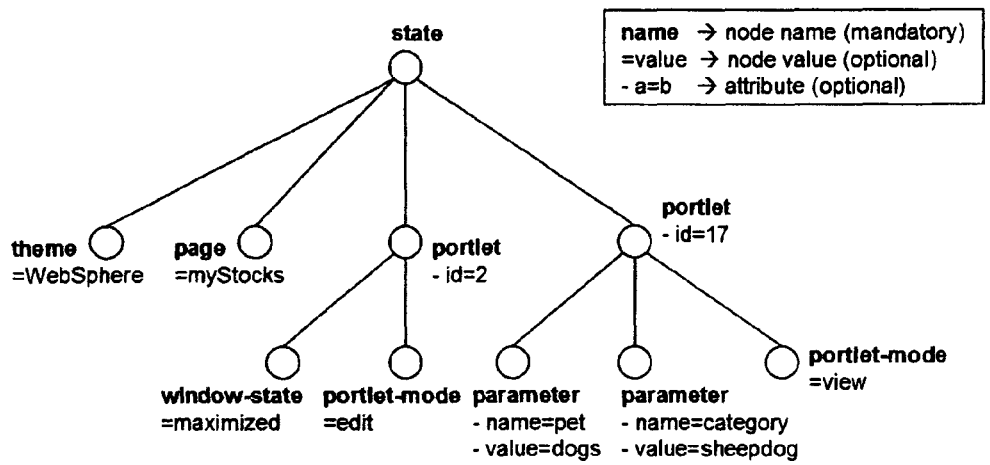

FIG. 2C

```
<?xml version="1.0" encoding="UTF-8"?>
<!ELEMENT state (portlet*, page?, expansions?, theme? )>
<!ELEMENT portlet (portlet-mode?, window-state?, parameter*)>
<!ATTLIST portlet
    id CDATA #REQUIRED
>

<!ELEMENT portlet-mode (#PCDATA)>
<!ATTLIST portlet-mode
        type (view | edit | help | config) #IMPLIED
>

<!ELEMENT window-state (#PCDATA)>
<!ATTLIST window-state
        type (normal | maximized | minimized) #IMPLIED
>

<!ELEMENT parameter EMPTY>
<!ATTLIST parameter
        name CDATA #REQUIRED
    value CDATA #IMPLIED
>

<!ELEMENT page (#PCDATA)>

<!ELEMENT theme (#PCDATA)>

<!ELEMENT expansions (node+)>

<!ELEMENT node EMPTY>
<!ATTLIST node
        id CDATA #REQUIRED
>
```

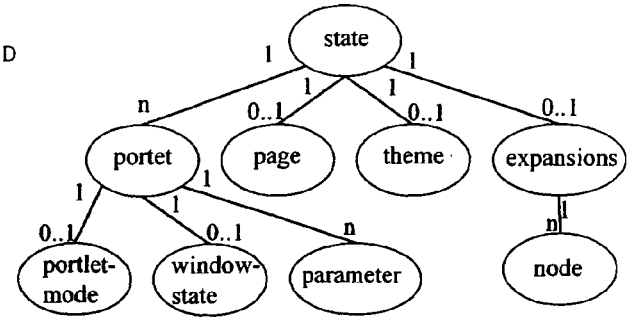

FIG. 2D

```
state → A
  portlet → A
    id → A
    portlet-mode → B
      view → A
      edit → B
      config → C
      help → D
    window-state → C
      maximized → A
      normal → B
      minimized → C
    parameter → D
      name → A
      value → B
  page → B
  expansions → C
    node → A
      id → A
  theme → D special mapping: null → Z
```

METHOD AND SYSTEM FOR EFFICIENTLY HANDLING NAVIGATIONAL STATE IN A PORTAL

CROSS REFERENCE TO RELATED APPLICATIONS

This application claims benefit under 35 U.S.C. 119(e) to Provisional U.S. application entitled "A Method for Efficiently Representing Navigational State in a Web Application", Ser. No. 60/748,699, filed Dec. 8, 2005.

FIELD OF THE INVENTION

The present invention relates to a method, system and computer program product for efficiently handling navigational state in a Portal application, and in particular to reduce the markup size of Portal pages, reduce URL length, and reduce processing time needed to generate the URLs being part of the Portal page.

BACKGROUND

Navigational state as used by the present invention describes "the current view of the Portal that is the result of all navigational interactions of a particular client". The client can request (query) different views by interacting with the Portal page, e.g. by navigating to a new page. This type of interaction does not change server side state but only requests a new view of the server; it is therefore a "safe" operation in terms of HTTP. The nature of this interaction is such that the client can navigate back and forward through its recent views using the back and forward button of his browser and that clients can bookmark views and get back to them at a later point in time by invoking a browser bookmark.

One of the main features of HTTP is that it is a stateless protocol i.e. the notion of a session spanning multiple request/response interactions does not exist in HTTP. But as nearly all application scenarios require some mechanism to save their state across requests some mechanisms have emerged that allow for creating (logical) stateful sessions and that can be certainly considered as state of the art nowadays. The two most popular prior art state saving mechanisms are the following:

To initiate a logical session between the client (typically a browser) and the server, the server returns an extra "set-cookie" response header to the client containing basically name value pairs. The client stores the cookie persistently in a file and associates it with the server's URL. With each request, the client provides this cookie back to the server using the "cookie" request header. By analyzing the cookie, the server (not the HTTP server but the application or a server-side script such as a servlet or CGI) can identify the user-specific session containing the needed state information. Note that cookies also allow for maintaining state across session boundaries as the persistent cookie file on the client typically lives longer than the corresponding session on the server.

This second variant exchanges the complete state information between server and client. The server stores the state in the markup of the requested page using a hidden input file of a (HTML) form. In addition, the application makes sure that each URL in the markup of a page initiates a form submit causing the state being part of the hidden input field to flow along with the request to the HTTP server.

In today's Web applications even navigational state is mostly saved across requests using one of the outlined mechanisms. However, both approaches have some major drawbacks with regard to bookmarkability, caching, back/forward button, and indexing by search engines ("crawlability").

Storing the navigational state in a logical server-side HTTP session (e.g. identified via a cookie) has the following disadvantages:

Browser bookmarks do not work as the navigational state kept in the server-side session has only a limited lifetime. Typically the session times out after a period of inactivity. After a session timeout, the navigational state cannot be restored on the server i.e. the server will deliver a default view on the application.

Navigating back and forward through the recent views using the back and forward button of the browser does not work. Note that the state does not get lost in that case as long as the session is maintained but the operations of the back and forward button do not take any effect on that state.

The benefits of caching (browser-side, server-side, and proxy caching) are considerably reduced as such caches typically use the URL as their cache key. The cache entries are overwritten with almost each interaction leading to a cache hit rate of almost zero.

Web search engines cannot index the site well. Search engines work by storing information about a large number of Web pages which they retrieve from the Web itself. These pages are retrieved by a Web-browser called "Web crawler" that follows every URL/URL it sees on the page (in the markup respectively).

Storing the navigational state in a hidden input field of a HTML form has less disadvantages but it also does not solve all problems summarized. Bookmarkability works as long as the respective page is cached. The back and forward button works. The caching and crawlability problem remains. Note that state management relying on hidden input fields cannot be applied in the Portal area as the mechanism requires a page-level form. However, a page level form cannot be used the markup of JSR 168 compliant portlets may also make use of HTML forms thus causing nested forms (forbidden by the HTML standard).

It is object of the present invention to provide a method, system and computer program product for efficiently encoding navigational state of a Portal avoiding the disadvantages of the existing prior art.

SUMMARY OF THE INVENTION

The present invention provides a method, system, and computer program product for efficiently handling navigational state by separating the navigational state into a base navigational state part and a delta navigational state part. The base navigational state which describes that part of the latest navigational state that is identical across all URLs is encoded in the header of the page markup to be submitted to the client's browser. The delta navigational part that describes the semantics of that specific URL is encoded in its associated URL. Each user interaction using such URL causes the browser to submit the base part as well as the delta part. On the server side the base and delta part are being merged resulting in new latest navigation state serving as a basis for the rendering of the new page. The new latest navigational state is represented as a hierarchical tree-like structure that can be serialized efficiently and compressed by prior art compression techniques. The hierarchical tree-like structure is based on a well-defined state model that is optimized in terms of state serialization. The state model arranges the contained navigational state information in character based information. That saves processing time as it avoids type conversion of navigational state information. In addition the present invention includes further strategies to reduce the amount of information that must be serialized.

BRIEF DESCRIPTION OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

FIG. 2C-D shows exemplary representations of the navigational state (state document) according to the present invention.

DETAILED DESCRIPTION OF EXEMPLARY EMBODIMENTS

Figure 1:
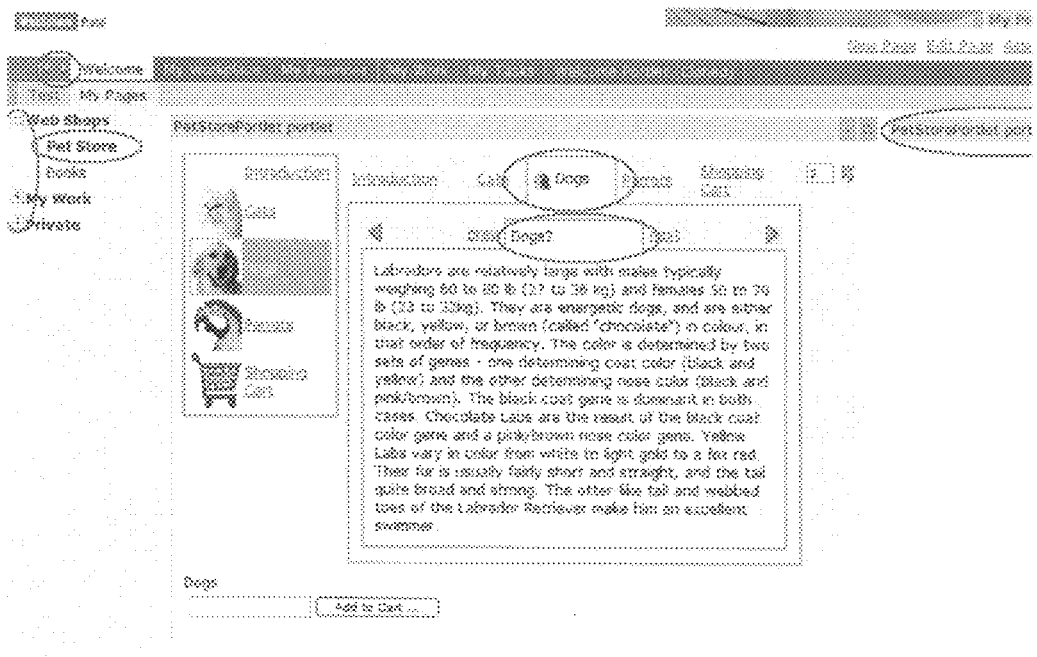
FIG. 1 shows a screenshot of a Portal in which various parts of UI making up the navigational state of this particular view are highlighted.

Today's Web applications become more and more complex, in particular in the Portal environment where several components (Portlets) are combined into a larger Portal application. This leads to the problem that the navigational state "describing" a certain view of the Web application becomes quite voluminous. In the Portal scenario, for example, it must aggregate the navigational state of all portlets the user interacted with.

The invention provides a method for efficiently handling navigational state with following advantages compared to the prior art solutions:

Reduced Markup Size

Encoding the navigational state into each URL takes the risk of considerably increasing the size of the markup that has to be transferred to the client. That will be avoided by the present invention.

Reduced URL Length

Disregarding markup size it is also important to keep the single URLs as short as possible. HTTP limits the maximum length of an URL to 2 KB. If this limit is exceeded proxy servers receiving such a long URL typically shorten the URL to 2 KB. The present invention makes sure that that limit is not exceeded.

Reduced URL Generation Time

The prior art navigation state handling involves pages offering a lot of URLs (hundreds of URLs per page are not exceptional). Therefore the processing time needed to generate an URL has a big impact on the overall server-side rendering time and thus on the overall performance of the Portal. The present invention keeps the processing time as low as possible, in particular the time that is needed to serialize the (complex) navigational state into an URL, because that is crucial to meet the performance requirements in terms of server-side processing time.

The present invention describes how above mentioned advantages with respect to markup size, URL length, and URL generation processing time are achieved by using a delta encoding method as claimed in claim 1.

The basic idea of the present invention—delta encoding—is to separate the navigational state a URL must encode into two parts:

The so-called base navigational state (latest base navigational state) describes the complete navigational state a user currently sees on his or her client device, and the so-called delta navigational state expresses the specific semantics of an URL. In other words, the state delta defines the state transition that should be done in case that the URL is invoked (e.g. by clicking on it).

Note that the base navigational state is typically much more complex than the delta navigational state because the base navigational state reflects the complete navigational state that has been piled up little by little by previous interactions. The delta navigational state in turn just consists of a small piece of information that represents the semantics of the respective URL.

The distinction between the base navigational state and the URL-specific delta navigational state might be explicitly reflected in the URL itself. For instance, the URL generation implementation might choose to serialize the base state as well as the delta state into the path info of the URL like this (the "base" token indicates the serialized base state and the "delta" token in turn the serialized delta state): http://www-.myportal.com:80/portal/public/base/ajasdkjh6zuz7hjhsg iuzrakjssdfkjhsakjizutejhsdkhjjhgsdf/delta/hsdjhuh When receiving a request using such an URL, the target servlet merges the base navigational state with the delta navigational state to obtain the complete navigational state or view that was requested (latest new navigational state). The resulting state—called new latest navigational state—serves as the new request-specific base state for all URLs generated within that request. To avoid serializing the base navigational state for each URL created during rendering, the base navigational state can be pre-serialized right after the action phase because after action processing is completed the base navigational state cannot be altered any more.

The writing of an URL to the markup during rendering depends on whether the URL needs to be absolute, server-relative, or relative.

Absolute URLs

An absolute URL is a complete URL containing protocol, hostname, and port.

Server-Relative URLs

Server relative URLs start with the servlet context path. Protocol, hostname, and port information is implied by the browser.

Relative URLs

In the case of a relative URL the browser appends the URL to either the current request URL or to the value of the HTML base tag (if any).

Absolute and server-relative URLs need to encode the base state and the delta state. To create such URLs, the pre-serialized base state can be included into the URL as is whereas the URL-specific delta state has to be serialized before appending it to the URL.

However, in the frequent case of relative URLs it is sufficient to include the serialized delta state into the URL whereas the pre-serialized base state can be kept in the HTML base tag (which accordingly has to be written only once per page as it refers to all relative URLs being part of the page). The markup fragment depicted below illustrates the usage of relative URLs. When clicking on one of the two toolbar URLs, the browser will append the relative URL ("delta/ . . . ") to the value of the base tag.

```
<head>
    <base href="http://myportal.com:80/portal/public/base/sd7Sj9SPykssy0xPAIasuz!</base>
</head>
<body>
...
        <td class="toolbar" valign="middle" nowrap>
            <a href="delta/L2dJQvUasdsa!" class="toolbar_link">Administration</a>
        </td>
        <td class="toolbar" valign="middle" nowrap>
            <a href="delta/Ghadkj4j!" class="toolbar_link">Edit Page</a>
        </td>
...
```

Figure 2A:
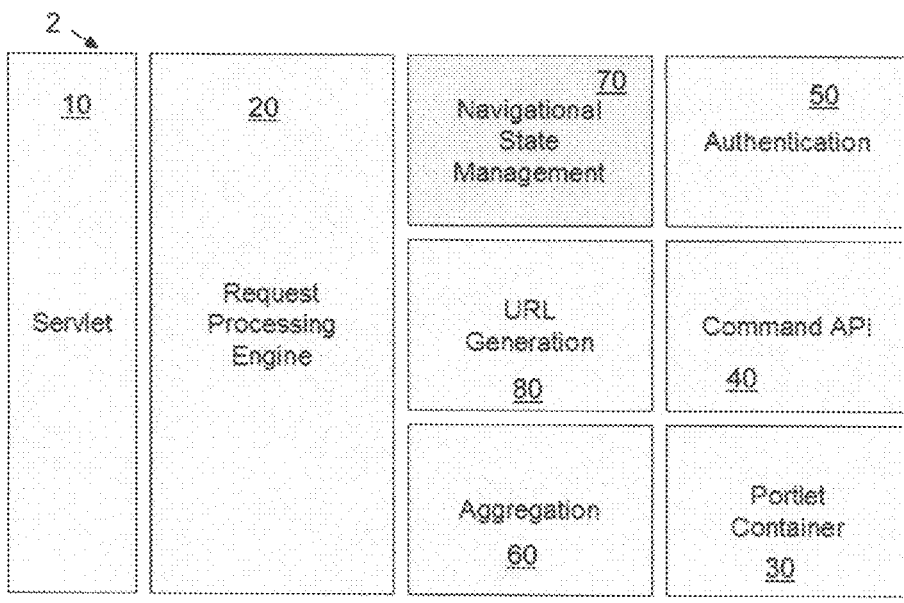
FIG. 2A shows preferred Portal structure for implementing the present invention.

As highlighted in the screenshot depicted in FIG. 2A, the navigational state that corresponds with the depicted view comprises the state of several page elements including Portlets. Typically each URL contained in the displayed markup encodes the navigational state of all those elements. Additionally each URL encodes the state delta which determines what the Portal should do in case that a user clicks on such an URL.

In other words, all URLs of a page define a state transition matrix. The target state of a transition is equivalent with the state that can be obtained by merging the delta state with the base state. Thus the state transition matrix is extended dynamically depending on the URL the user clicked on.

| | Generated URLs | | |
|---|---|---|---|
| Request | Base state | Delta state | Merged state |
| 1 | — | $D_1$ | $B_1$ |
|   | — | $D_2$ | $B_2$ |
|   | — | $D_3$ | $B_3$ |
|   | — | $D_4$ | $B_4$ |
| 2 | $B_3$ | $D_1$ | $B_{21}$ |
|   | $B_3$ | $D_2$ | $B_{22}$ |
|   | $B_3$ | $D_3$ | $B_{23}$ |
|   | $B_3$ | $D_4$ | $B_{24}$ |
| 3 | $B_{24}$ | $D_5$ | $B_{31}$ |
|   | $B_{24}$ | $D_6$ | $B_{32}$ |
|   | $B_{24}$ | $D_7$ | $B_{33}$ |
| 4 | $B_{31}$ | $D_5$ | $B_{41}$ |
|   | $B_{31}$ | $D_6$ | $B_{42}$ |
|   | $B_{31}$ | $D_7$ | $B_{43}$ |

The table above shows a simple state transition matrix. The second column "Generated URLs" lists the base state, delta state-pairs for all URLs generated during the render phase of the respective request processing (first column). The third column lists the potential result state that would form the new base state when processing the respective URL. The first request represents the initial request going to the Portal. It is typically triggered by the user entering the Portal URL into the browser address bar. The response on this initial request delivers a default view on the Portal. Therefore the rendered URLs do not contain a base navigational state (because the default navigational state can be implied by the Portal). Assuming that the user clicks on the third URL next (third row in the table), the new base navigational state $B_3$ would correspond with the delta state $D_3$ (as no merge is required). Assuming that the clicked URL does not switch to a different Portal page, the Portal potentially renders again the four URLs. However, this time the URLs contain the base navigational state $B_3$ because disregarding which URL is activated next, the navigational state should be maintained. Subsequently, the user might click on the forth URL of that page (eighth row in the table) resulting in the new base state $B_{24}$ and so on.

The present invention is preferably implemented in a Portal structure which is described in connection with FIG. 2A.

FIG. 2A shows the Portal structure implementing the present invention.

The Portal structure preferably comprises function components which are already part of each prior art Portal and those components which are newly added in order to provide the inventive functionality.

The prior art function components which are being part of each Portal are following:

The Servlet 10 is the front controller that receives the incoming HTTP requests. It typically prepares the request processing engine 20 for processing the received HTTP request by initializing the components involved. After that the servlet 10 delegates the processing of the request to the request processing engine 20.

Request Processing Engine 20

The request processing engine 20 is also part of the front controller being responsible for controlling the processing of the incoming requests. Typically it defines a request processing lifecycle that is made up of several request processing phases. In a Portal a request has to walk through four phases. First, the init phase performs request-specific initialization tasks followed by the action phase being responsible for authentication and action execution (Portlet actions as well as commands). After the action phase the render phase is executed by invoking the aggregation process. The terminal phase concludes request processing by performing request-specific cleanup tasks.

Aggregation Component 60

The aggregation component 60 is invoked during the render phase of the request processing lifecycle. It is responsible for transforming the layout model of the requested page into a presentation tree as well as writing the markup that corresponds to this presentation tree to the response.

Authentication Component 50

The authentication component 50 is responsible for verifying the identity of the user. Each incoming request has to pass authentication. The Portal 2 uses the user identity to determine the content the user is authorized to access as well as the commands to execute.

Portlet Container 30

The Portlet container 30 provides unified access to the Portlets. In particular it allows for gathering the markup of a certain Portlet or executing a Portlet action. The Portlet container 30 invokes Portlets by means of the Portlet API.

Command API 40

The command API 40 (application programming interface) provides an abstraction layer for Portal-specific commands. In particular it allows for executing commands via a unified interface. Commands may be used to perform administrative tasks such as creating and/or deleting Portal pages, adding and/or removing Portlets to and/or from Portal pages, arranging Portlets on existing pages and so on.

The newly added function components that provide the inventive functionality are following:

Navigational State Management Component 70

The navigational state management component 70 component is the key component realizing the present invention in the Portal 2. The responsibilities of this new component are the following: defining a lifecycle for navigational state as well as providing an interface that enables the request processing engine 20 to incorporate the defined state processing tasks into the overall request processing lifecycle, defining an object model to represent navigational state as well as providing an application programming interface (API) that allows for reading and writing/modifying navigational state, providing a framework that allows for efficiently serializing the object representation of navigational state into an URL as well as de-serializing navigational state from an (incoming) URL to restore the internal object representation. The framework needs to include interfaces that can be invoked by the URL generation component to create URLs carrying navigational state, URL Generation API 80

The URL generation API 80 provides, as the name implies, an API that allows for creating URLs for a variety of use cases. It enables the programmer to associate navigational state with the created URL as well as to write the URL to a given destination stream. This write operation involves serializing the navigational state that has been associated with the created URL. In addition to creating URLs programmatically, the URL generation API typically offers some URL tags to create URLs within JSPs.

Note that by default a created URL is initialized with the request-specific navigational state to make sure that the navigational state of previous interactions does not get lost. To determine the specific semantics of the URL this navigational state may be changed for this particular URL only.

Figure 2B:
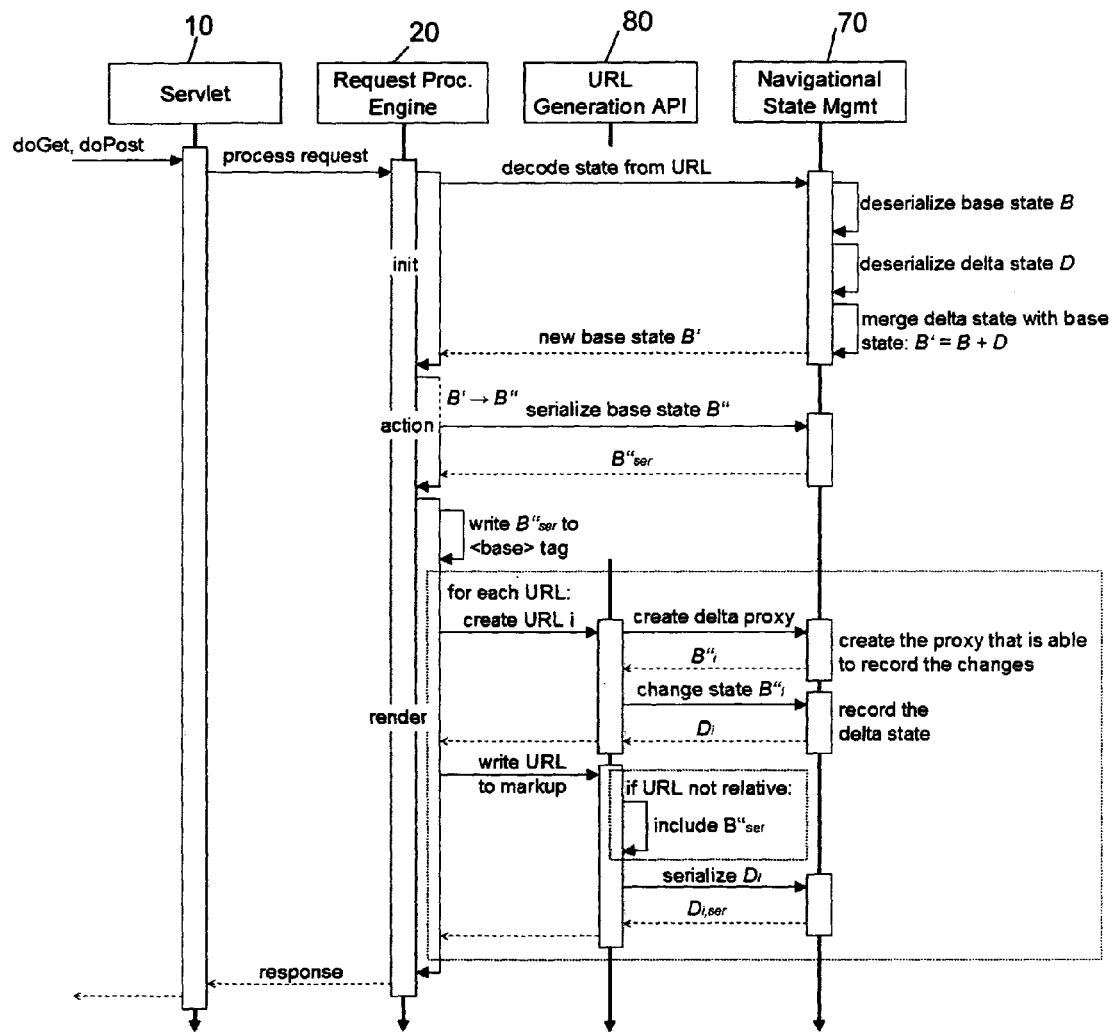
FIG. 2B shows an interaction diagram of a preferred embodiment of the method for efficiently handling navigational state according to the present invention in a Portal according to FIG. 2A.

FIG. 2B shows an interaction diagram of a preferred embodiment of the present invention—called delta encoding—in a Portal according to FIG. 2 A.

The delta encoding method can be put into practice by defining a lifecycle for navigational state. The lifetime of the navigational state that is associated with a particular client is one HTTP request. FIG. 2 B shows a component interaction diagram that illustrates how the different steps are aligned with the superior request processing lifecycle:

Init Phase

During the init phase the navigational state has to be decoded from the incoming request URL. State decoding is delegated to the navigational state management component 70 and involves de-serializing the base navigational state B as well as the delta navigational state D, and after de-serialization, merging the delta navigational state D with the base navigational state B to obtain the new base navigational state B' for this request. After initialization is completed the object representing the new latest base navigational state B' is passed to the action phase for further processing.

Action Phase

During the action phase the business logic is executed. Portlet actions are invoked via the portlet container and commands via the command API (note that these steps are not depicted in the diagram for simplicity reasons). The base state B' is potentially modified during action processing; let B" be the result of these modifications.

As the base state B" must not be altered any more after action processing, it is serialized before starting the rendering. Let $B''_{ser}$ be the serialized base state B".

Render Phase

At the very beginning of the render phase, more precisely when writing the HTML header of the page that should be displayed, the pre-serialized base navigational state $B''_{ser}$ is included as part of an absolute URL into the HTML <base> tag.

The actual rendering performed subsequently involves the generation of multiple URLs. In FIG. 2B this step has been dumbed down to the components generating the URLs. Actually these components are invoked indirectly via the Portlet container or aggregation component depending on whether the URLs are part of Portlet markup or not. For each URL created via the URL generation API 80 the implementation performs the following steps: Before changing the navigational state to specify the semantics of the specific URL, a so-called delta proxy is created. The delta proxy $B''_i$ is a wrapper enclosing the navigational state object B" that records the state modifications applied to B".

Subsequently the URL generation component creates the target navigational state of the respective URL by applying the needed changes (according to the usage of the URL generation API) to the obtained delta proxy $B''_i$.

Finally the created URL is written to the markup. This involves serializing the delta state $D_i$ recorded by the delta proxy $B''_i$ and, in case that the URL cannot be relative, prepending the pre-serialized base state $B''_{ser}$.

The crucial steps of the delta encoding are the following: the merging step performed during state decoding (init phase) makes sure that the delta navigational states created during rendering are minimal deltas. This implies that the serialized delta navigational states remain minimal in terms of length, the merging step during state decoding and the base state pre-serialization step at the end of the action phase ensure that the URLs can be generated very fast during rendering. In case of non-relative URLs, the already serialized base state can be included into the URL as is. The creation of relative URLs during the render phase keeps the URLs short thus reducing the markup size of the rendered page considerably because the URLs need only contain the minimum delta state whereas the serialized base state being much longer is part of the URL contained in the base tag.

FIG. 2C-D show exemplary representations of the navigational state (state document) according to the present invention. This section deals with the internal representation of navigational state in an object model. Choosing a suitable object representation is crucial to tune the single steps of the delta encoding approach discussed in the previous sections. The recommended design is based on the assumption that a typical Portal page contains a lot of URLs i.e. the object representation of navigational state must be optimized in terms of URL encoding. Applying this assumption to the delta encoding approach outlined above that means that the object representation must allow for efficiently recording and serializing delta states as well as serializing base states.

Therefore it is recommended to model navigational state using a hierarchic document model containing un-typed state information represented as characters (or Strings in terms of Java). The character-based memory representation allows to efficiently serializing navigational state into URLs, because it avoids time and CPU consuming object to string conversions during the serialization process.

FIG. 2C shows an exemplary simplified state document model. Note that the depicted state document is simplified. It contains the navigational state of just two Portlets and in addition page selection information as well as theme information. In a realistic business scenario a Portal page typically aggregates multiple navigation controls, toolbars, and portlets (up to 20 portlets in average) potentially making the state document much more complex.

One of the common object-oriented design patterns is to separate read-only interfaces from read-write interfaces (controllers). Accordingly, the used object model should offer two interfaces to the state document.

The DocumentModel interface provides read-access to the state document offering the following methods (UML notation): getRooto: Node—Returns the root node of the state document, getchildren(parent: Node): List—Returns a list of nodes representing the child nodes of the given parent, getParent(node: node): Node—Returns a node representing the parent of the given node. If the given node corresponds with the document root, the method will return null. Other methods such as hasChildren, hasAttributes, and getAttributes.

The DocumentController interface provides read-write access i.e. it additionally allows for modifying the hierarchic state document.

The DocumentController interface offers the following methods: insert(new: Node; next: Node; parent: Node): Node—Inserts the given node newNode into the state document at the specified position, remove(node: Node): Node—Removes the given node from the state document, create(namespace: String; name: String): Node—Creates a new node with the given name and namespace and returns the created Node object. Subsequently the created node can be inserted into the state hierarchy using the insert method.

other methods such as setValue, addAttribute, setAttributes, removeAttribute, and clearAttributes.

The used interface Node models a single node in the document model hierarchy. This node is not aware of its position in the hierarchy or of its attributes, but only of its content.

The Node interface offers the following methods:

getNodeName( ): String—Returns the qualified name of the node.

getNodeValue( ): String—Returns the value of the node.

getNamespaceURI: String—Returns the namespace URI of the node.

The interface can be applied to the sample state as shown in 2 C.

Serializing the Base State

When serializing the base navigational state, the complete state document has to be serialized to be included into URLs or into the HTML base tag during rendering. The needed serialization mechanism has to serialize the minimal information (the so-called "entropy") that is needed to restore (de-serialize) the complete state document when receiving an URL. This includes the document structure, i.e. parent child relationships, and the document content data, i.e. node names, values, and attributes.

To keep the URLs short, this information has to be encoded as compact as possible. A compact encoding of the document structure can be achieved by using a simple bit encoding that writes the level of each element (the depth relative to the root) using a given traversal algorithm (e.g. depth-first traversal).

However, the document content data cannot be serialized as easy. Just traversing the state document and writing the complete information making up a node would result in an extremely long serialized form.

The preferred embodiment is to map the node names, attribute names, and pre-defined values to short character representations. To put this into practice the structure of a state document has to be precisely specified either in a document type definition (DTD) or in a XML schema (XSD). From this specification a mapping table can be derived that can be used for state serialization and state de-serialization. The depicted document type definition in FIG. 2 D shows an exemplary structure of a state document. The depicted tree in FIG. 2D visualizes this structure.

The preferred embodiment to create the needed mapping table is to parse the DTD and map each element name, attribute, and value found to a short character representation. However, one can also exploit the hierarchic structure of the DTD and build a corresponding hierarchic mapping tree. Taking a character set such as UTF 8 as a basis for the short character representations one can define a really complex state structure without needing to make use of character representations that are longer than one character (because the mappings need to be only unique within the set of children of a particular element).

An example of a mapping tree that corresponds with the state structure of above is shown in FIG. 2 E (the hierarchy is modelled via indentations).

Recording the Delta State and Serializing it

Assume a Portlet on a page that wants to offer an URL that sets the Portlet into the Portlet-mode "Configure" to enable the user to switch to the view that allows for configuring the Portlet. To create this URL the Portlet uses the URL generation API to request a Portlet-mode change URL. Internally the URL generation API implementation performs the mode change using the DocumentController interface. Actually the Portlet uses the Portlet API to generate the URL. However, under the covers the Portal delegates this request to the central URL generation API of the Portal.

Figures 2E, 2F:
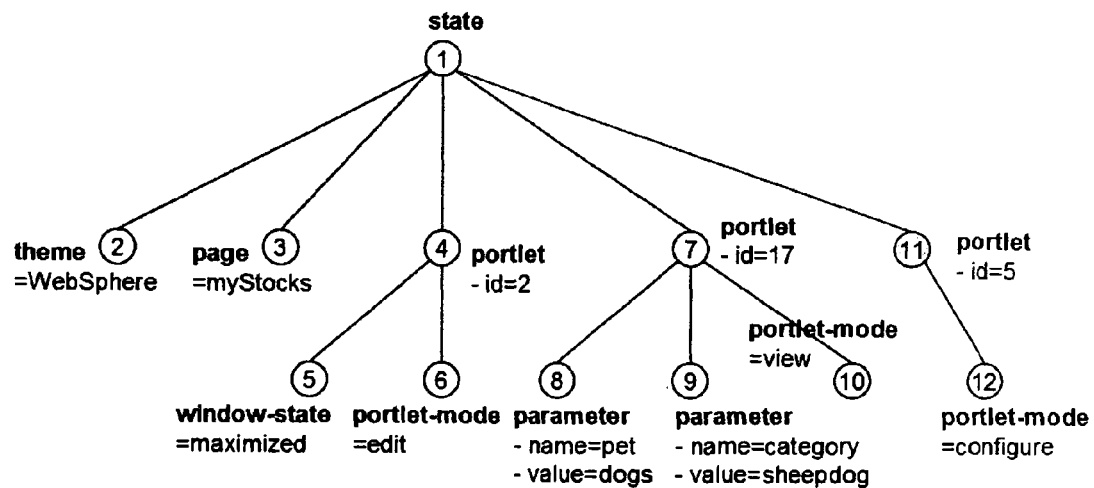
FIG. 2E shows an exemplary mapping table for a state document as shown in FIG. 2D.
FIG. 2F shows a modified state document according to the present invention.

Let the identifier of the portlet be "5". Assuming that the underlying base state is the one that corresponds with the document illustrated in FIG. 2C the result navigational state (base+delta) would look like the state document as shown in FIG. 2F. The portlet mode change results in the nodes and edges that are highlighted red being added.

According to the delta encoding approach the generated URL should only reflect this change (and the change should certainly not modify the base state that has already been pre-serialized at this time of request processing).

The preferred embodiment is to get the URL generation implementation to believe that it really modifies the state document it operates on. However, under the covers, the respective modification operations are intercepted and handled specially. This can be easily put into practice by using a proxy pattern i.e. by creating a "proxy" document that encloses the real state document.

Figure 2G:
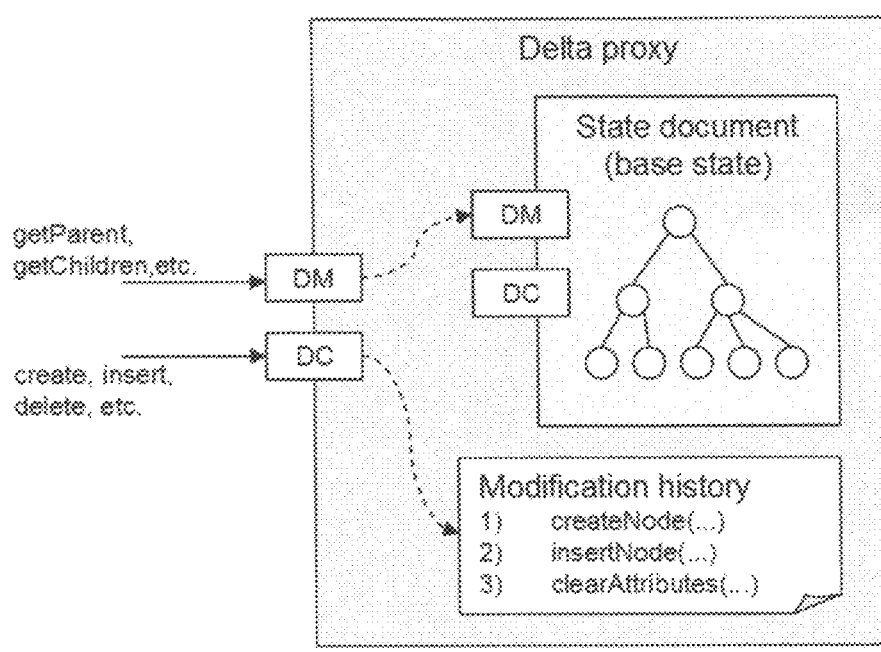
FIG. 2G shows the delta proxy approach that records state modification according to a preferred embodiment of the present invention.

The proxy approach is depicted in FIG. 2G. The delta proxy is created for each URL that should be created. The delta proxy also exposes the DocumentModel (DM) and DocumentController (DC) interface. However the proxy implementation merely delegates the DocumentModel (read) invocations to the underlying state document representing the base state. The modification operations done via the DocumentController interface are intercepted and recorded in an internal modification history.

FIG. 2G would result in the following modification history:
create node "portlet"
addAttribute "id" with the value "5" to the created node
insert node "portlet" as the last child of node "state"
create node "portlet-mode"
setvalue "configure"
insert node "portlet-mode" as the last child of the created node "portlet"

When encoding the delta state into the URL it is sufficient to serialize the recorded series of modification operations. To achieve a compact serialized form, the following strategies can be used:

1. Map the modification operations to short identifiers.
   This can be easily done by numbering the modification operations:

| DocumentController | ID |
| --- | --- |
| Insert | 0 |
| Create | 1 |
| Remove | 2 |
| setValue | 3 |
| addAttribute | 4 |
| clearAttributes | 5 |
| setAttributes | 6 |
| removeAttribute | 7 |

2. Map the involved operation arguments (nodes) to short identifiers.
   Nodes that already exist in the base state document the delta refers to can be easily referenced via an integer that for example corresponds with the visit position when traversing the base document using a certain traversal algorithm (e.g. depth first traversal). New nodes are referenced using a new unassigned integer. As the DocumentController interface also accepts null values a special integer (e.g. "0") has to be introduced representing null.

3. Reuse the mapping tree of the base state serialization to map constant tokens (i.e. node names, attribute names, pre-defined node values, pre-defined attribute values) to short character representations.

Using these strategies the serialized delta state may have the form
<operations>/<nodes>/<tokens>.

The operation encoded at the beginning implies the number of nodes that belong to these operations. For example, if the operation sequence starts with "0" (corresponds to insert), the first three arguments must belong to it because the insert method of the DocumentController requires three arguments. The same strategy can be applied to the tokens—in case of a encoded create method the delta decoding can imply that there are two tokens specifying the node that should be created (qualified name and namespace).

The table as shown below lists for each operation how many arguments and tokens it expects:

| DocumentController operation | ID | Expected number of | Expected number of |
| --- | --- | --- | --- |
| Insert | 0 | 3 | 0 |
| Create | 1 | 1 (new ID!) | 2 |
| Remove | 2 | 1 | 0 |
| setValue | 3 | 1 | 1 |
| addAttribute | 4 | 1 | 2 |
| clearAttributes | 5 | 1 | 0 |
| setAttributes | 6 | 1 | Depends on number of attributes |
| removeAttribute | 7 | 1 | 1 |

Assuming the mapping tables listed above and applying them to the above modification history the delta state is encoded as follows:
140130/11,111,11,0,1,12,12,12,0,1/ZAA5ZBC Compressing the serialized data using for example GZIP will further shorten the serialized form.

The figures include block diagram illustrations of methods, apparatus(s) and computer program products according to an embodiment of the invention. It will be understood that each block of the figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

The invention claimed is:

1. A method for efficiently encoding navigational state in a Portal, wherein said Portal is running in a server system, wherein said server system includes a communication component which allows communication between said Portal and a client's browser via a communication channel, wherein said Portal determines a layout of a Portal page, invokes rendering of a plurality of page elements belonging to said Portal page, and transmits said Portal page to the client's browser for displaying, wherein at least one of said page elements belonging to said Portal page provides a URL for initiating rendering of a new page or new page element by said Portal, wherein each user interaction by clicking said URL at said page element generates a new navigational state at said Portal, wherein a latest navigational state describes a current view of said Portal resulting from all previous navigational interactions of said client, wherein at least said latest navigational state is saved by said Portal, wherein in response to a client request for a new Portal page said method is characterized by the steps of:

creating a base navigational state which describes a part of the latest navigational state that is identical across a plurality of URLs in said new Portal page, creating for each of said URLs in said new Portal page a URL specific delta navigational state which describes a state transition to obtain a new base navigational state by merging said URL specific delta navigational state with said base navigational state when a corresponding one of said URLs is invoked, wherein said URL specific delta navigational state is not contained in said base navigational state, encoding said base navigational state once into a header portion of markup of said new Portal page once, encoding said URL specific delta navigational state into its corresponding one of said URLs as part of a body portion of said markup of said new Portal page, and generating and transmitting a response to said client's browser including said markup of said new Portal page for displaying by said client's browser.

2. The method according to claim 1, wherein said base navigational state and said URL specific delta navigational state are encoded in said markup of said new Portal page in a serialized form.

3. The method according to claim 2, further comprising the steps of:

receiving a subsequent client request including said base navigational state and said URL specific delta navigational state, de-serializing said base navigational state and said URL specific delta navigational state, merging said URL specific delta navigational state with said base navigational state resulting in said new base navigational state, internally representing said new base navigational state in a hierarchical tree-like object representation, pre-serializing said new base navigational state, and storing said pre-serialized new base navigational state in an HTML base tag.

4. The method according to claim 2, wherein said encoding of each URL specific delta navigational state is based on a serialization method which operates on a delta proxy object that records modifications to a hierarchical tree-like object representation representing a new latest base navigational state.

5. The method according to claim 4, wherein said hierarchical tree-like object representation contains nodes which are described by name, value, and attributes represented by character based strings.

6. The method according to claim 5, wherein nodes within said hierarchical tree-like object representation are read by a read-only programming interface and modified by a read-write programming interface.

7. The method according to claim 2, wherein serialization of the URL specific delta navigational state is performed during rendering of said Portal page.

8. The method according to claim 2, wherein serialization of said URL specific delta navigational state is performed including compression by at least one compression algorithm.

9. The method according to claim 8, wherein said at least one compression algorithm comprises GZip, Zip, or RLE.

10. The method according to claim 9, wherein a compressed serialization result representing said URL specific delta navigational state is encoded into path information of said URL.

11. A system for efficiently encoding navigational state in a Portal, wherein said Portal is running in said system, wherein said system includes a communication component which allows communication between said Portal and a client's browser via a communication channel, wherein said Portal determines a layout of a Portal page, invokes rendering of a plurality of page elements belonging to said Portal page, and transmits said Portal page to the client's browser for displaying, wherein at least one of said page elements belonging to said Portal page provides a URL for initiating rendering of a new page or new page element by said Portal, wherein each user interaction by clicking said URL at said page element generates a new navigational state at said Portal, wherein a latest navigational state describes a current view of said Portal resulting from all previous navigational interactions of said client, wherein at least said latest navigational state is saved by said Portal, wherein said system is characterized by the following components that operate in response to a client request for a new Portal page:

component for creating a base navigational state which describes a part of the latest navigational state that is identical across a plurality of URLs in said new Portal page, component for creating for each of said URLs in said new Portal page a URL specific delta navigational state which describes a state transition to obtain a new base navigational state by merging said URL specific delta navigational state with said base navigational state when said URL is invoked, wherein said URL specific delta navigational state is not contained in said base navigational state, component for encoding said base navigational state once into a header portion of markup of said new Portal page, component for encoding each said URL specific delta navigational state into its corresponding one of said URLs as part of a body portion of said markup of said new Portal page, and component for generating and transmitting a response to said client's browser including said markup of said new Portal page for displaying by said client's browser.

12. The system according to claim 11, wherein said components are part of said Portal.

* * * * *